(12) United States Patent
Wagner et al.

(10) Patent No.: US 9,781,814 B2
(45) Date of Patent: Oct. 3, 2017

(54) LIGHTING CONTROL WITH INTEGRAL DIMMING

(71) Applicant: ABL IP Holding LLC, Conyers, GA (US)

(72) Inventors: Phillip Ryan Wagner, Baltimore, OH (US); Robert Burt, Columbus, OH (US); Christopher Scott Shelton, Kennesaw, GA (US)

(73) Assignee: ABL IP Holding LLC, Decatur, GA (US)

( * ) Notice: Subject to any disclaimer, the term of this patent is extended or adjusted under 35 U.S.C. 154(b) by 58 days.

(21) Appl. No.: 14/882,843

(22) Filed: Oct. 14, 2015

(65) Prior Publication Data

US 2016/0113096 A1 Apr. 21, 2016

Related U.S. Application Data

(60) Provisional application No. 62/064,240, filed on Oct. 15, 2014.

(51) Int. Cl.
*H05B 33/08* (2006.01)
*H05B 37/02* (2006.01)
*H05B 37/03* (2006.01)

(52) U.S. Cl.
CPC ..... *H05B 37/0272* (2013.01); *H05B 33/0851* (2013.01); *H05B 37/034* (2013.01); *Y02B 20/48* (2013.01)

(58) Field of Classification Search
None
See application file for complete search history.

(56) References Cited

U.S. PATENT DOCUMENTS 2,924,806 A 2/1960 Hubbell et al.
3,066,276 A 11/1962 Hubbell et al.
(Continued)

FOREIGN PATENT DOCUMENTS

CN 102958227 3/2013
DE 102004030883 1/2006
(Continued)

OTHER PUBLICATIONS

Office Action for Canadian Application No. CA 2,908,751, mailed Dec. 8, 2016, 2 pages.

(Continued)

*Primary Examiner* — Dedei K Hammond
(74) *Attorney, Agent, or Firm* — Kilpatrick Townsend & Stockton, LLP

(57) ABSTRACT

Lighting control devices, network systems, and methodologies, including methods for providing closed-loop dimming control of such systems, are described. In some examples, disclosed methods and device configurations may include an intelligent photo control configured to accept target dimmed fixture wattage value commands from a user, and provide closed-loop control at the fixture to achieve that target wattage via real-time adjustment of the 0-10V dimming control signal sent to the LED driver. As such, the need for trial-and-error adjustments of the 0-10V analog control voltage, or derivation of dim voltage to fixture wattage response curves in order to achieve a desired fixture wattage level, may be reduced or eliminated.

20 Claims, 3 Drawing Sheets

(56) References Cited

U.S. PATENT DOCUMENTS

| | | |
|---|---|---|
| 3,083,347 A | 3/1963 | Fahey, Jr. |
| 3,112,973 A | 12/1963 | Von Holtz |
| 3,149,317 A | 9/1964 | Brugliera et al. |
| 3,206,709 A | 9/1965 | De Vore, Jr. |
| 3,233,204 A | 2/1966 | De Vore, Jr. |
| 3,292,135 A | 12/1966 | Robinson |
| 3,339,171 A | 8/1967 | Carlson |
| 3,350,675 A | 10/1967 | Misencik et al. |
| 3,393,395 A | 7/1968 | Hubbell |
| 3,500,291 A | 3/1970 | Hubbell et al. |
| 3,747,104 A | 7/1973 | Pansini |
| 3,945,702 A | 3/1976 | Poliak et al. |
| 3,949,211 A | 4/1976 | Elms |
| 4,241,969 A | 12/1980 | D'Amato et al. |
| 4,477,143 A | 10/1984 | Taylor |
| 4,482,844 A | 11/1984 | Schweer et al. |
| 4,653,834 A | 3/1987 | Norden |
| 4,691,341 A | 9/1987 | Knoble et al. |
| 4,695,769 A | 9/1987 | Schweickardt |
| 4,726,780 A | 2/1988 | Thackeray |
| 5,046,961 A | 9/1991 | Hoffman |
| 5,235,320 A | 8/1993 | Romano |
| 5,450,302 A | 9/1995 | Maase et al. |
| 5,452,294 A | 9/1995 | Natarajan |
| 5,479,159 A | 12/1995 | Kelly et al. |
| 5,537,008 A | 7/1996 | Matsuda et al. |
| 5,546,397 A | 8/1996 | Mahany |
| 5,593,318 A | 1/1997 | Bilson et al. |
| 5,641,310 A | 6/1997 | Tiberio, Jr. |
| 5,647,751 A | 7/1997 | Shulman et al. |
| 5,652,751 A | 7/1997 | Sharony |
| 5,654,968 A | 8/1997 | Smiroldo |
| 5,661,468 A | 8/1997 | Marcoux |
| 5,680,926 A | 10/1997 | Sandor et al. |
| 5,740,366 A | 4/1998 | Mahany et al. |
| 5,741,149 A | 4/1998 | Anthony |
| 5,805,593 A | 9/1998 | Busche |
| 5,823,833 A | 10/1998 | Castaldo |
| 5,844,893 A | 12/1998 | Gollnick et al. |
| 5,884,181 A | 3/1999 | Arnold et al. |
| 5,940,771 A | 8/1999 | Gollnick et al. |
| 5,962,991 A | 10/1999 | Levy |
| 5,963,546 A | 10/1999 | Shoji |
| 5,986,574 A | 11/1999 | Colton |
| 6,028,396 A | 2/2000 | Morrissey, Jr. et al. |
| 6,028,853 A | 2/2000 | Haartsen |
| 6,035,266 A | 3/2000 | Williams et al. |
| 6,044,062 A | 3/2000 | Brownrigg et al. |
| 6,046,992 A | 4/2000 | Meier et al. |
| 6,119,076 A | 9/2000 | Williams et al. |
| 6,130,881 A | 10/2000 | Stiller et al. |
| 6,166,698 A | 12/2000 | Turnbull et al. |
| 6,174,073 B1 | 1/2001 | Regan et al. |
| 6,181,086 B1 | 1/2001 | Katyl et al. |
| 6,181,294 B1 | 1/2001 | Porter et al. |
| 6,192,053 B1 | 2/2001 | Angelico et al. |
| 6,239,722 B1 | 5/2001 | Colton et al. |
| 6,249,516 B1 | 6/2001 | Brownrigg et al. |
| 6,275,707 B1 | 8/2001 | Reed et al. |
| 6,297,781 B1 | 10/2001 | Turnbull et al. |
| 6,301,257 B1 | 10/2001 | Johnson et al. |
| 6,304,556 B1 | 10/2001 | Haas |
| 6,328,581 B1 | 12/2001 | Lee et al. |
| 6,349,091 B1 | 2/2002 | Li |
| 6,370,489 B1 | 4/2002 | Williams et al. |
| 6,374,311 B1 | 4/2002 | Mahany et al. |
| 6,388,396 B1 | 5/2002 | Katyl et al. |
| 6,392,368 B1 | 5/2002 | Deller et al. |
| 6,393,381 B1 | 5/2002 | Williams et al. |
| 6,396,216 B1 | 5/2002 | Noone et al. |
| 6,407,712 B1 | 6/2002 | Turnbull et al. |
| 6,415,245 B2 | 7/2002 | Williams et al. |
| 6,437,692 B1 | 8/2002 | Petite et al. |
| 6,452,339 B1 | 9/2002 | Morrissey et al. |
| 6,456,960 B1 | 9/2002 | Williams et al. |
| 6,462,713 B2 | 10/2002 | Porter et al. |
| 6,465,963 B1 | 10/2002 | Turnbull et al. |
| 6,509,841 B1 | 1/2003 | Colton et al. |
| 6,535,498 B1 | 3/2003 | Larsson et al. |
| 6,553,020 B1 | 4/2003 | Hughes et al. |
| 6,574,227 B1 | 6/2003 | Rosenberg et al. |
| 6,592,245 B1 | 7/2003 | Tribelsky et al. |
| 6,604,062 B2 | 8/2003 | Williams et al. |
| 6,636,005 B2 | 10/2003 | Wacyk et al. |
| 6,640,087 B2 | 10/2003 | Reed et al. |
| 6,650,249 B2 | 11/2003 | Meyer et al. |
| 6,653,945 B2 | 11/2003 | Johnson et al. |
| 6,665,536 B1 | 12/2003 | Mahany |
| 6,676,279 B1 | 1/2004 | Hubbell et al. |
| 6,704,283 B1 | 3/2004 | Stiller et al. |
| 6,705,744 B2 | 3/2004 | Hubbell et al. |
| 6,714,559 B1 | 3/2004 | Meier |
| 6,714,895 B2 | 3/2004 | Williams et al. |
| 6,731,079 B2 | 5/2004 | Andersen |
| 6,734,642 B1 | 5/2004 | Reverberi |
| 6,744,740 B2 | 6/2004 | Chen |
| 6,744,766 B2 | 6/2004 | Alapuranen |
| 6,750,823 B2 | 6/2004 | Turnbull et al. |
| 6,751,455 B1 | 6/2004 | Acampora |
| 6,754,192 B2 | 6/2004 | Kennedy |
| 6,757,268 B1 | 6/2004 | Zendle |
| 6,771,666 B2 | 8/2004 | Barker, Jr. |
| 6,807,165 B2 | 10/2004 | Belcea |
| 6,807,516 B2 | 10/2004 | Williams et al. |
| 6,836,737 B2 | 12/2004 | Petite et al. |
| 6,841,944 B2 | 1/2005 | Morrissey et al. |
| 6,850,502 B1 | 2/2005 | Kagan et al. |
| 6,870,846 B2 | 3/2005 | Cain |
| 6,879,574 B2 | 4/2005 | Naghian et al. |
| 6,883,930 B2 | 4/2005 | Saban et al. |
| 6,889,174 B2 | 5/2005 | Williams et al. |
| 6,892,168 B2 | 5/2005 | Williams et al. |
| 6,903,699 B2 | 6/2005 | Porter et al. |
| 6,917,985 B2 | 7/2005 | Madruga et al. |
| 6,944,131 B2 | 9/2005 | Beshai et al. |
| 6,965,568 B1 | 11/2005 | Larsen |
| 6,965,575 B2 | 11/2005 | Srikrishna et al. |
| 6,970,444 B2 | 11/2005 | Chwieseni et al. |
| 6,977,937 B1 | 12/2005 | Weinstein et al. |
| 6,980,537 B1 | 12/2005 | Liu |
| 6,982,982 B1 | 1/2006 | Barker, Jr. et al. |
| 6,990,394 B2 | 1/2006 | Pasternak |
| 6,991,346 B2 | 1/2006 | Saban et al. |
| 7,011,552 B2 | 3/2006 | Hoxha |
| 7,013,138 B2 | 3/2006 | Mahany |
| 7,050,808 B2 | 5/2006 | Janusz et al. |
| 7,103,511 B2 | 9/2006 | Petite |
| 7,113,893 B2 | 9/2006 | Williams et al. |
| 7,120,560 B2 | 10/2006 | Williams et al. |
| 7,123,140 B1 | 10/2006 | Denes |
| 7,126,494 B2 | 10/2006 | Ardalan et al. |
| 7,144,260 B2 | 12/2006 | Murayama et al. |
| 7,167,777 B2 | 1/2007 | Budike, Jr. |
| 7,209,840 B2 | 4/2007 | Petite et al. |
| 7,254,372 B2 | 8/2007 | Janusz et al. |
| 7,307,514 B2 | 12/2007 | McAden |
| 7,309,965 B2 | 12/2007 | Dowling et al. |
| 7,312,721 B2 | 12/2007 | Mason, Jr. et al. |
| 7,333,903 B2 | 2/2008 | Walters et al. |
| 7,358,679 B2 | 4/2008 | Lys et al. |
| 7,369,056 B2 | 5/2008 | McCollough, Jr. |
| 7,386,002 B2 | 6/2008 | Meier |
| 7,429,828 B2 | 9/2008 | Cleland et al. |
| 7,446,671 B2 | 11/2008 | Giannopoulos et al. |
| 7,457,645 B2 | 11/2008 | Choi et al. |
| 7,468,561 B2 | 12/2008 | Kern et al. |
| 7,468,661 B2 | 12/2008 | Petite et al. |
| 7,489,120 B2 | 2/2009 | Matthews |
| 7,493,100 B2 | 2/2009 | Welles, II et al. |
| 7,529,594 B2 | 5/2009 | Walters et al. |
| 7,535,921 B2 | 5/2009 | Meier |
| 7,546,167 B2 | 6/2009 | Walters et al. |
| 7,546,168 B2 | 6/2009 | Walters et al. |
| 7,548,553 B2 | 6/2009 | Meier |

(56) References Cited

U.S. PATENT DOCUMENTS

| | | |
|---|---|---|
| 7,549,773 B2 | 6/2009 | Lim |
| 7,561,062 B2 | 7/2009 | Schleich et al. |
| 7,565,006 B2 | 7/2009 | Stam et al. |
| 7,602,937 B2 | 10/2009 | Mian et al. |
| 7,603,184 B2 | 10/2009 | Walters et al. |
| 7,637,766 B2 | 12/2009 | Kauffman et al. |
| 7,697,492 B2 | 4/2010 | Petite |
| 7,710,907 B2 | 5/2010 | Mahany |
| 7,731,383 B2 | 6/2010 | Myer |
| 7,734,356 B2 | 6/2010 | Cleland et al. |
| 7,761,260 B2 | 7/2010 | Walters et al. |
| 7,778,635 B2 | 8/2010 | Crookham et al. |
| 7,791,492 B2 | 9/2010 | Nam et al. |
| 7,796,030 B2 | 9/2010 | Lim |
| 7,817,063 B2 | 10/2010 | Hawkins et al. |
| 7,825,602 B2 | 11/2010 | Hu et al. |
| 7,825,793 B1 | 11/2010 | Spillman et al. |
| 7,828,463 B1 | 11/2010 | Willis |
| 7,834,555 B2 | 11/2010 | Cleland et al. |
| 7,855,540 B2 | 12/2010 | Matthews |
| 7,860,672 B2 | 12/2010 | Richeson et al. |
| 7,866,850 B2 | 1/2011 | Alexander et al. |
| 7,873,343 B2 | 1/2011 | Gollnick et al. |
| 7,899,207 B2 | 3/2011 | Mian et al. |
| 7,911,359 B2 | 3/2011 | Walters et al. |
| 7,916,747 B2 | 3/2011 | Meier |
| 7,972,054 B2 | 7/2011 | Alexander et al. |
| 7,985,005 B2 | 7/2011 | Alexander et al. |
| 8,013,718 B2 | 9/2011 | McCollough, Jr. |
| 8,029,154 B2 | 10/2011 | Myer |
| 8,038,481 B1 | 10/2011 | Creighton et al. |
| 8,072,164 B2 | 12/2011 | Ilyes et al. |
| 8,100,552 B2 | 1/2012 | Spero |
| 8,136,969 B2 | 3/2012 | Burkett |
| 8,138,630 B2 | 3/2012 | Dibachi et al. |
| 8,140,279 B2 | 3/2012 | Subbloie |
| 8,152,336 B2 | 4/2012 | Alexander et al. |
| 8,177,395 B2 | 5/2012 | Alexander et al. |
| 8,188,878 B2 | 5/2012 | Pederson et al. |
| 8,188,879 B2 | 5/2012 | Pederson |
| 8,243,004 B2 | 8/2012 | Fergason |
| 8,264,156 B2 | 9/2012 | Cleland et al. |
| 8,290,710 B2 | 10/2012 | Cleland |
| 8,396,608 B2 | 3/2013 | Subbloie et al. |
| 8,398,435 B2 | 3/2013 | Aurongzeb et al. |
| 8,414,178 B2 | 4/2013 | Alexander et al. |
| 8,433,426 B2 | 4/2013 | Cleland et al. |
| 8,434,909 B2 | 5/2013 | Nichol et al. |
| 8,445,826 B2 | 5/2013 | Verfuerth |
| 8,456,325 B1 | 6/2013 | Sikora |
| 8,463,454 B2 | 6/2013 | Ilyes |
| 8,471,698 B2 | 6/2013 | Petrisor et al. |
| 8,475,002 B2 | 7/2013 | Maxik et al. |
| 8,476,565 B2 | 7/2013 | Verfuerth |
| 8,502,456 B2 | 8/2013 | Jarrell et al. |
| 8,538,596 B2 | 9/2013 | Gu et al. |
| 8,541,949 B2 | 9/2013 | Donners |
| 8,562,180 B2 | 10/2013 | Alexander et al. |
| 8,570,190 B2 | 10/2013 | Marinakis et al. |
| 8,586,902 B2 | 11/2013 | Verfuerth |
| 8,587,222 B2 | 11/2013 | Amutham |
| 8,587,223 B2 | 11/2013 | Ilyes et al. |
| 8,588,830 B2 | 11/2013 | Myer et al. |
| 8,588,942 B2 | 11/2013 | Agrawal |
| 8,593,299 B2 | 11/2013 | Pederson |
| 8,602,584 B2 | 12/2013 | Ghafoori et al. |
| 8,604,712 B2 | 12/2013 | Bloom et al. |
| 8,641,241 B2 | 2/2014 | Farmer |
| 8,674,629 B2 | 3/2014 | Agrawal |
| 8,686,664 B2 | 4/2014 | Herbst et al. |
| 8,686,665 B2 | 4/2014 | Horbst et al. |
| 8,694,256 B2 | 4/2014 | Cleland et al. |
| 8,706,310 B2 | 4/2014 | Barrilleaux |
| 8,716,942 B2 | 5/2014 | Jarrell et al. |
| 8,725,330 B2 | 5/2014 | Failing |
| 8,729,446 B2 | 5/2014 | Verfuerth |
| 8,731,866 B2 | 5/2014 | Cacace et al. |
| 8,732,031 B2 | 5/2014 | Martin et al. |
| 9,049,753 B1 | 6/2015 | Wassel et al. |
| 2001/0005368 A1 | 6/2001 | Rune |
| 2001/0034793 A1 | 10/2001 | Madruga et al. |
| 2002/0002444 A1 | 1/2002 | Williams et al. |
| 2002/0009975 A1 | 1/2002 | Janusz et al. |
| 2002/0013679 A1 | 1/2002 | Petite |
| 2002/0013856 A1 | 1/2002 | Garcia-Luna-Aceves et al. |
| 2002/0044549 A1 | 4/2002 | Johansson et al. |
| 2002/0158805 A1 | 10/2002 | Turnbull et al. |
| 2002/0159274 A1 | 10/2002 | Hubbell et al. |
| 2002/0161556 A1 | 10/2002 | Williams et al. |
| 2002/0163805 A1 | 11/2002 | Hubbell et al. |
| 2002/0176396 A1 | 11/2002 | Hammel et al. |
| 2002/0181427 A1 | 12/2002 | Sparr et al. |
| 2004/0001442 A1 | 1/2004 | Rayment et al. |
| 2004/0062224 A1 | 4/2004 | Brownrigg et al. |
| 2004/0105264 A1 | 6/2004 | Spero |
| 2004/0143380 A1 | 7/2004 | Stam et al. |
| 2004/0151129 A1 | 8/2004 | Kun-Szabo et al. |
| 2004/0218382 A1 | 11/2004 | Saban et al. |
| 2004/0248578 A1 | 12/2004 | Korpela et al. |
| 2004/0252643 A1 | 12/2004 | Joshi |
| 2005/0029955 A1 | 2/2005 | Blake |
| 2005/0035720 A1 | 2/2005 | Blake |
| 2005/0054292 A1 | 3/2005 | Janusz et al. |
| 2005/0151666 A1 | 7/2005 | Saban et al. |
| 2005/0187701 A1 | 8/2005 | Baney et al. |
| 2005/0253533 A1 | 11/2005 | Lys et al. |
| 2005/0270537 A1 | 12/2005 | Mian et al. |
| 2006/0002368 A1 | 1/2006 | Budampati et al. |
| 2007/0014119 A1 | 1/2007 | Burkett |
| 2007/0021946 A1 | 1/2007 | Williams et al. |
| 2007/0032990 A1 | 2/2007 | Williams et al. |
| 2007/0040513 A1 | 2/2007 | Cleland et al. |
| 2007/0043540 A1 | 2/2007 | Cleland et al. |
| 2007/0043541 A1 | 2/2007 | Cleland et al. |
| 2007/0153526 A1 | 7/2007 | Lim |
| 2007/0273509 A1 | 11/2007 | Gananathan |
| 2007/0273539 A1 | 11/2007 | Gananathan |
| 2008/0177994 A1 | 7/2008 | Mayer |
| 2008/0211427 A1 | 9/2008 | Budde et al. |
| 2008/0211430 A1 | 9/2008 | Wilhelm |
| 2008/0219210 A1 | 9/2008 | Shuey et al. |
| 2008/0292320 A1 | 11/2008 | Pederson |
| 2008/0309504 A1 | 12/2008 | Lim |
| 2008/0310850 A1 | 12/2008 | Pederson et al. |
| 2009/0001893 A1 | 1/2009 | Cleland et al. |
| 2009/0009089 A1 | 1/2009 | Burkett |
| 2009/0040750 A1 | 2/2009 | Myer |
| 2009/0050785 A1 | 2/2009 | Flaherty |
| 2009/0066258 A1 | 3/2009 | Cleland et al. |
| 2009/0066540 A1 | 3/2009 | Marinakis et al. |
| 2009/0083167 A1 | 3/2009 | Subbloie |
| 2009/0088021 A1 | 4/2009 | Kauffman et al. |
| 2009/0096623 A1 | 4/2009 | Roosli et al. |
| 2009/0224940 A1 | 9/2009 | Cornwall |
| 2009/0262189 A1 | 10/2009 | Marman |
| 2009/0267540 A1 | 10/2009 | Chemel et al. |
| 2009/0278472 A1 | 11/2009 | Mills et al. |
| 2009/0278479 A1 | 11/2009 | Platner et al. |
| 2009/0315466 A1 | 12/2009 | Ko et al. |
| 2010/0007521 A1 | 1/2010 | Cornwall |
| 2010/0013608 A1 | 1/2010 | Petrisor et al. |
| 2010/0027838 A1 | 2/2010 | Mian et al. |
| 2010/0029268 A1 | 2/2010 | Myer et al. |
| 2010/0039240 A1 | 2/2010 | Rodriguez et al. |
| 2010/0127642 A1 | 5/2010 | Chen et al. |
| 2010/0204960 A1 | 8/2010 | Hagadone |
| 2010/0252715 A1 | 10/2010 | Flaherty |
| 2010/0264853 A1 | 10/2010 | Amutham |
| 2010/0286841 A1 | 11/2010 | Subbloie |
| 2010/0287081 A1 | 11/2010 | Walters et al. |
| 2010/0308736 A1 | 12/2010 | Hung et al. |
| 2011/0038288 A1 | 2/2011 | Osterloh et al. |
| 2011/0049749 A1 | 3/2011 | Bailey et al. |
| 2011/0050100 A1 | 3/2011 | Bailey et al. |

(56) References Cited

U.S. PATENT DOCUMENTS

| | | |
|---|---|---|
| 2011/0050101 A1 | 3/2011 | Bailey et al. |
| 2011/0050124 A1 | 3/2011 | Bailey et al. |
| 2011/0051414 A1 | 3/2011 | Bailey et al. |
| 2011/0057570 A1 | 3/2011 | Cleland et al. |
| 2011/0063849 A1 | 3/2011 | Alexander et al. |
| 2011/0068624 A1 | 3/2011 | Dibachi et al. |
| 2011/0074598 A1 | 3/2011 | Cornwall et al. |
| 2011/0085322 A1 | 4/2011 | Myer |
| 2011/0095867 A1 | 4/2011 | Ahmad |
| 2011/0122272 A1 | 5/2011 | Fergason |
| 2011/0133655 A1 | 6/2011 | Recker et al. |
| 2011/0134239 A1 | 6/2011 | Vadai et al. |
| 2011/0163694 A1 | 7/2011 | Donners |
| 2011/0184577 A1 | 7/2011 | Ilyes |
| 2011/0215735 A1 | 9/2011 | Herbst et al. |
| 2011/0215736 A1 | 9/2011 | Horbst et al. |
| 2011/0222301 A1 | 9/2011 | Knoedgen et al. |
| 2011/0227487 A1 | 9/2011 | Nichol et al. |
| 2011/0255303 A1 | 10/2011 | Nichol et al. |
| 2011/0273906 A1 | 11/2011 | Nichol et al. |
| 2011/0298422 A1 | 12/2011 | Failing |
| 2011/0301795 A1 | 12/2011 | Failing |
| 2011/0302078 A1 | 12/2011 | Failing |
| 2011/0307112 A1 | 12/2011 | Barrilleaux |
| 2012/0001566 A1 | 1/2012 | Josefowicz et al. |
| 2012/0020060 A1 | 1/2012 | Myer et al. |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0043909 A1 | 2/2012 | Bloom et al. |
| 2012/0044350 A1 | 2/2012 | Verfuerth |
| 2012/0059622 A1 | 3/2012 | Cacace et al. |
| 2012/0062123 A1 | 3/2012 | Jarrell et al. |
| 2012/0062128 A1 | 3/2012 | Spillman et al. |
| 2012/0080944 A1 | 4/2012 | Recker et al. |
| 2012/0086386 A1 | 4/2012 | Dibachi et al. |
| 2012/0086560 A1 | 4/2012 | Ilyes et al. |
| 2012/0086561 A1 | 4/2012 | Ilyes et al. |
| 2012/0091915 A1 | 4/2012 | Ilyes et al. |
| 2012/0129517 A1 | 5/2012 | Fox et al. |
| 2012/0136485 A1 | 5/2012 | Weber et al. |
| 2012/0136497 A1 | 5/2012 | Subbloie |
| 2012/0139426 A1 | 6/2012 | Ilyes et al. |
| 2012/0143383 A1 | 6/2012 | Cooperrider et al. |
| 2012/0146518 A1 | 6/2012 | Keating et al. |
| 2012/0147604 A1 | 6/2012 | Farmer |
| 2012/0153868 A1 | 6/2012 | Gu et al. |
| 2012/0190386 A1 | 7/2012 | Anderson |
| 2012/0194352 A1 | 8/2012 | Ellis et al. |
| 2012/0206050 A1 | 8/2012 | Spero |
| 2012/0218738 A1 | 8/2012 | Alexander et al. |
| 2012/0230696 A1 | 9/2012 | Pederson |
| 2012/0243231 A1 | 9/2012 | Vadai et al. |
| 2012/0251123 A1 | 10/2012 | Pederson et al. |
| 2012/0262093 A1 | 10/2012 | Recker et al. |
| 2012/0282815 A1 | 11/2012 | Aurongzeb et al. |
| 2012/0306382 A1 | 12/2012 | Maxik et al. |
| 2013/0015783 A1 | 1/2013 | Herbst |
| 2013/0038221 A1 | 2/2013 | Cleland et al. |
| 2013/0040471 A1 | 2/2013 | Gervais et al. |
| 2013/0044444 A1 | 2/2013 | Creighton et al. |
| 2013/0057158 A1 | 3/2013 | Josefowicz et al. |
| 2013/0058352 A1 | 3/2013 | Goergen et al. |
| 2013/0069998 A1 | 3/2013 | Fergason |
| 2013/0082606 A1 | 4/2013 | Viner et al. |
| 2013/0107041 A1 | 5/2013 | Norem et al. |
| 2013/0134880 A1 | 5/2013 | Rea et al. |
| 2013/0135118 A1 | 5/2013 | Ricci |
| 2013/0141252 A1 | 6/2013 | Ricci |
| 2013/0144453 A1 | 6/2013 | Subbloie |
| 2013/0144460 A1 | 6/2013 | Ricci |
| 2013/0144469 A1 | 6/2013 | Ricci |
| 2013/0144486 A1 | 6/2013 | Ricci |
| 2013/0144520 A1 | 6/2013 | Ricci |
| 2013/0147638 A1 | 6/2013 | Ricci |
| 2013/0155085 A1 | 6/2013 | Fergason |
| 2013/0155702 A1 | 6/2013 | Rea et al. |
| 2013/0175947 A1* | 7/2013 | Hamel ................ H05B 37/029 315/297 |
| 2013/0181609 A1 | 7/2013 | Agrawal |
| 2013/0181614 A1 | 7/2013 | Agrawal |
| 2013/0181636 A1 | 7/2013 | Agrawal |
| 2013/0187552 A1 | 7/2013 | Frodsham et al. |
| 2013/0193868 A1 | 8/2013 | Bueno et al. |
| 2013/0210252 A1 | 8/2013 | Ilyes |
| 2013/0211613 A1 | 8/2013 | Praske et al. |
| 2013/0221944 A1 | 8/2013 | Cheng et al. |
| 2013/0241419 A1 | 9/2013 | Ghafoori et al. |
| 2013/0249409 A1 | 9/2013 | Vanwagoner et al. |
| 2013/0250618 A1 | 9/2013 | Nichol et al. |
| 2013/0253713 A1 | 9/2013 | Vanwagoner et al. |
| 2013/0257284 A1 | 10/2013 | Vanwagoner et al. |
| 2013/0257289 A1 | 10/2013 | Vanwagoner et al. |
| 2013/0257291 A1* | 10/2013 | Tabor ................ H05B 37/0218 315/152 |
| 2013/0272125 A1 | 10/2013 | Espina Perez et al. |
| 2013/0285556 A1 | 10/2013 | Challapali et al. |
| 2013/0293117 A1 | 11/2013 | Verfuerth |
| 2013/0293877 A1 | 11/2013 | Ramer et al. |
| 2013/0297212 A1 | 11/2013 | Ramer et al. |
| 2013/0320193 A1 | 12/2013 | Liken et al. |
| 2013/0334970 A1 | 12/2013 | Jarrell et al. |
| 2013/0342131 A1 | 12/2013 | Recker et al. |
| 2013/0346229 A1 | 12/2013 | Martin et al. |
| 2014/0028144 A1 | 1/2014 | Parviainen et al. |
| 2014/0028200 A1 | 1/2014 | Van Wagoner et al. |
| 2014/0035482 A1 | 2/2014 | Rains, Jr. et al. |
| 2014/0036473 A1 | 2/2014 | Agrawal |
| 2014/0037297 A1 | 2/2014 | Pederson |
| 2014/0049166 A1 | 2/2014 | Yoon |
| 2014/0049983 A1 | 2/2014 | Nichol et al. |
| 2014/0056028 A1 | 2/2014 | Nichol et al. |
| 2014/0070731 A1 | 3/2014 | Chakravarty et al. |
| 2014/0071681 A1 | 3/2014 | Ghafoori et al. |
| 2014/0078308 A1 | 3/2014 | Verfuerth |
| 2014/0084795 A1 | 3/2014 | Cumpston et al. |
| 2014/0094136 A1 | 4/2014 | Huang |
| 2014/0097758 A1 | 4/2014 | Recker et al. |
| 2014/0111098 A1 | 4/2014 | Amarin et al. |
| 2014/0112537 A1 | 4/2014 | Frank et al. |
| 2015/0257229 A1* | 9/2015 | Wassel ................ H05B 37/02 315/307 |
| 2016/0113094 A1 | 4/2016 | Wagner et al. |

FOREIGN PATENT DOCUMENTS

| | | |
|---|---|---|
| JP | 2000277268 | 10/2000 |
| JP | 2006140026 | 6/2006 |
| JP | 2009004279 | 1/2009 |

OTHER PUBLICATIONS

Notice of Allowance for Canadian Application No. CA 2,908,835, mailed Aug. 3, 2016, 1 page.

Notice of Allowance for U.S. Appl. No. 14/883,786, mailed on Mar. 27, 2017 (8 pages).

* cited by examiner

LIGHTING CONTROL WITH INTEGRAL DIMMING

CROSS-REFERENCE TO RELATED APPLICATIONS

The present application claims priority to U.S. Provisional Patent Application No. 62/064,240, filed on Oct. 15, 2014, entitled "LIGHTING CONTROL WITH INTEGRAL DIMMING," the contents of which are hereby incorporated by reference in their entirety for all purposes.

BACKGROUND

The present disclosure generally relates to lighting control devices, network systems, and methodologies, including methods for providing closed-loop dimming control of such systems.

With respect to dimming control, some methods use arbitrary or poorly correlated 0 through 10V dimming signals, being applied and then adjusted manually, in order to achieve a specific fixture wattage or derivation of a dim voltage to fixture watts dimming command curve to be developed for every conceivable combination of LED drivers and light engines, in order to predict the appropriate dimming control voltage to be applied to achieve the desired fixture wattage.

Some fixture controls with dimming capability require both a photo control module (or "node") and a separate dimming control module. In such arrangements, the photo control module and dimming control module may include separate unique device identifiers, which can be used to identify the individual module on the control network. To properly control and diagnose a particular fixture SKU (unique combination of driver style, driver voltage, driver min/max current, LED count, LED type, etc.), the input Wattage characteristics of said fixture SKU must be characterized over the entire 0-10V dimming control voltage range. Aspects of this characterization may include, the driver end-point voltage thresholds (where the lower dead band stops and the upper dead band starts), and the resultant fixture Wattage at each of these two dead band threshold voltages.

During asset installation, an activation process may capture an identifier for the node and the associated fixture's SKU. A node profile, specific to the fixture SKU, is then manually created, e.g. at a network operation center (NOC), containing the dead band voltage thresholds. The node profile is pushed from the NOC to the node via the control network, and stored in the memory of the node.

A diagnostic table within the NOC must also be manually populated with a record containing: SKU (X), the fixture Wattage at each dead band threshold voltage, and node-internal digital codes that correspond to the two dead band voltage thresholds. Within the activation record for each node-equipped asset, the control module device and dimming control module device identifiers must also be paired (manually).

When daily fixture diagnostics are performed, the NOC must predict the expected dimmed fixture Wattage by referring to events/commands issued to/from the paired node identifiers, observing the dim command active during hourly time slices during the diagnostic period. The prediction may be derived using y=mx+b parameters stored in the NOC table. The NOC then compares this prediction to the actual reported fixture Watts from the node identifier to determine fixture status.

However, as with other human processes, aspects of current techniques may be relatively labor intensive, particularly for large-scale lighting systems, and allow for error related to, for example, fixture status and/or design changes, manual information entry and/or changes to, misidentification, and/or unrecognized system components, etc. There may also be problems pairing the identifiers of the specific control module and dimming control module for a given fixture in the NOC database/table. Moreover, many of these problems may be difficult to detect or correct, particularly in a large-scale networked lighting control system.

SUMMARY

According to first aspects of the disclosure, systems and methods that provide closed-loop dimming control for intelligent lighting systems are provided. In some examples, this can reduce or eliminate the need for currently used fixture characterizations, dimming profiles, and/or NOC table record entries mentioned above, and allow for processing user commands for dimming control that map directly to the percentage of the fixture's rated maximum Wattage.

The present subject matter provides, among other objects, closed-loop dimming control schemes that contemplate changes in hardware in tandem with firmware/NOC software modifications. By using, for example, 5 or 7 contact photo control (as defined in ANSI C136.41) fixture-integrated products, the need for manual pairing, and/or control module identifier capture during activation may be eliminated.

In some examples, a system for intelligent photo control may be configured to automatically detect key characteristics of the fixture to which it is installed, including dimming control capabilities and control/operation parameters. Human data entry components of current commissioning methods may be reduced or eliminated by incorporating automated diagnostic programs, e.g. into the photo control module firmware functionality and NOC software functionality.

In some examples, disclosed methods and device configurations may include an intelligent photo control configured to accept target dimmed fixture wattage value commands from a user, and provide closed-loop control at the fixture to achieve that target wattage via real-time adjustment of the 0-10V dimming control signal sent to the LED driver. As such, the need for trial-and-error adjustments of the 0-10V analog control voltage, or derivation of dim voltage to fixture wattage response curves in order to achieve a desired fixture wattage level, may be reduced or eliminated.

According to further aspects of the disclosure, a lighting fixture control system may include a control station configured to communicate with a plurality of fixture control devices located remotely from the control station, to receive a dimming command for at least one of the fixture control devices via a user interface, and to send a dimming setting command to the at least one of the fixture control devices based at least in part on the received dimming command. A fixture control device, that is associated with a lighting fixture, may be located remotely from the control station, and configured to dim the lighting fixture via a variable dimming control signal based at least in part on the dimming setting command and a Wattage measurement received from the lighting fixture.

In embodiments, the fixture control device may includes a dimming controller module; and a fixture power measurement module, each of which may be implanted as hardware and/or software components. In embodiments, the dimming controller module may be configured to determine a target Wattage based at least in part on the dimming setting command and to iteratively adjust the dimming control signal based at least in part on a fixture Wattage measurement obtained by the measurement module until the fixture Wattage measurement is within a predetermined range of the target Wattage.

In embodiments, the fixture control device may be configured to set a target Wattage based at least in part on the received dimming command, and to use closed-loop feedback to achieve the target Wattage. As used herein, closed-loop feedback should be understood as representing techniques that analyze the effects of a closed (feedback) loop of a dimming control signal (e.g. 1-10 V) provided to a lighting fixture, and that adjust the dimming control signal (as needed) based on the analysis. This may be performed, for example, by a fixture control device configured to provide a dimming control signal to a lighting fixture and to observe a measured wattage of the fixture in response to the dimming control signal.

In embodiments, the fixture control device may be configured to slew the dimming control signal until a fixture Wattage observed by the fixture control device is within a predetermined range of target Wattage.

In embodiments, the target Wattage may be determined based on at least one of a table of values associated with the lighting fixture, or a rated fixture maximum Wattage and a dimming setting command expressed as a percentage.

In embodiments, the fixture control device may be configured to determine a minimum dimmed Wattage supported by the lighting fixture via at least one iteration of the closed-loop feedback, and to limit attempts to dim the lighting fixture below the minimum dimmed Wattage.

In embodiments, the fixture control device may be configured to determine a driver dead band via at least one iteration of the closed-loop feedback, and to limit the dimming control signal during subsequent dimming operations to avoid the driver dead band.

In embodiments, the dimming control signal may be a 0-10 V control signal.

In embodiments, the fixture control device may use at least one of a PID control loop or a proportional control algorithm to vary the dimming control signal.

According to further aspects of the disclosure, a lighting fixture control apparatus may include one or more of a command receiving module configured to receive a dimming setting command from a remote command center; a dimming controller module; and a fixture power measurement module. In embodiments, the dimming controller module may be configured to determine a target Wattage value based at least in part on the dimming setting command, and to iteratively adjust a dimming control signal based at least on part on a fixture Wattage measurement provided by the fixture power measurement module until the fixture Wattage measurement is within a predetermined range of the target Wattage value.

In embodiments, the fixture control device may be configured to determine a minimum dimmed Wattage supported by the lighting fixture based on a plurality of the fixture Wattage measurements, and to limit attempts to dim the lighting fixture below the minimum dimmed Wattage.

In embodiments, the fixture control device may be configured to determine a driver dead band based on a plurality of the fixture Wattage measurements, and to limit the dimming control signal during subsequent dimming operations to avoid the driver dead band.

In embodiments, the fixture control device may be configured to override the dimming setting command in response to a sensor event, and to set a dimming level for the lighting fixture to a predetermined level for a default period of time based on the sensor event.

According to further aspects of the disclosure, a lighting fixture control system may include one or more of a processor; a communication device; and memory including computer-executable instruction that configure the processor to perform operations, including receiving a network identifier for a remote lighting control module associated with a lighting fixture; registering the lighting control module with the lighting fixture control system; determining whether at least one of the lighting control module or the lighting fixture supports a dimming function; enabling a dimming option in a user interface based on a determination that the at least one of the lighting control module or the lighting fixture supports a dimming function; receiving a dimming input control via the user interface; and/or providing a dimming setting signal to the lighting control module based at least in part on the received dimming input control.

In embodiments, a message that the target dimmed fixture wattage value or the target dimmed fixture lumen output has been implemented by the lighting control module may be generated by the lighting control module and received by the lighting fixture control system.

As discussed further below, disclosed systems and methods may provide a dimming controller sub-section and fixture power measurement sub-section in an intelligent photo control that work in conjunction to provide closed-loop dimming control. In some examples, a user may issue a command to the intelligent photo control to adjust the fixture to a desired wattage and then the closed loop control mechanism may automatically adjust the analog dimming control signal until that fixture wattage is achieved. Accordingly, in some examples, the arbitrary scales (e.g. 1-10) included in some remote dimming commands can be eliminated. Additionally, the requirement for calculating, and relying on, complex derivations of potentially non-linear response curves may be eliminated as well in certain embodiments.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Various example embodiments of the present disclosure will be described below with reference to the drawings constituting a part of the description.

Figure 1:
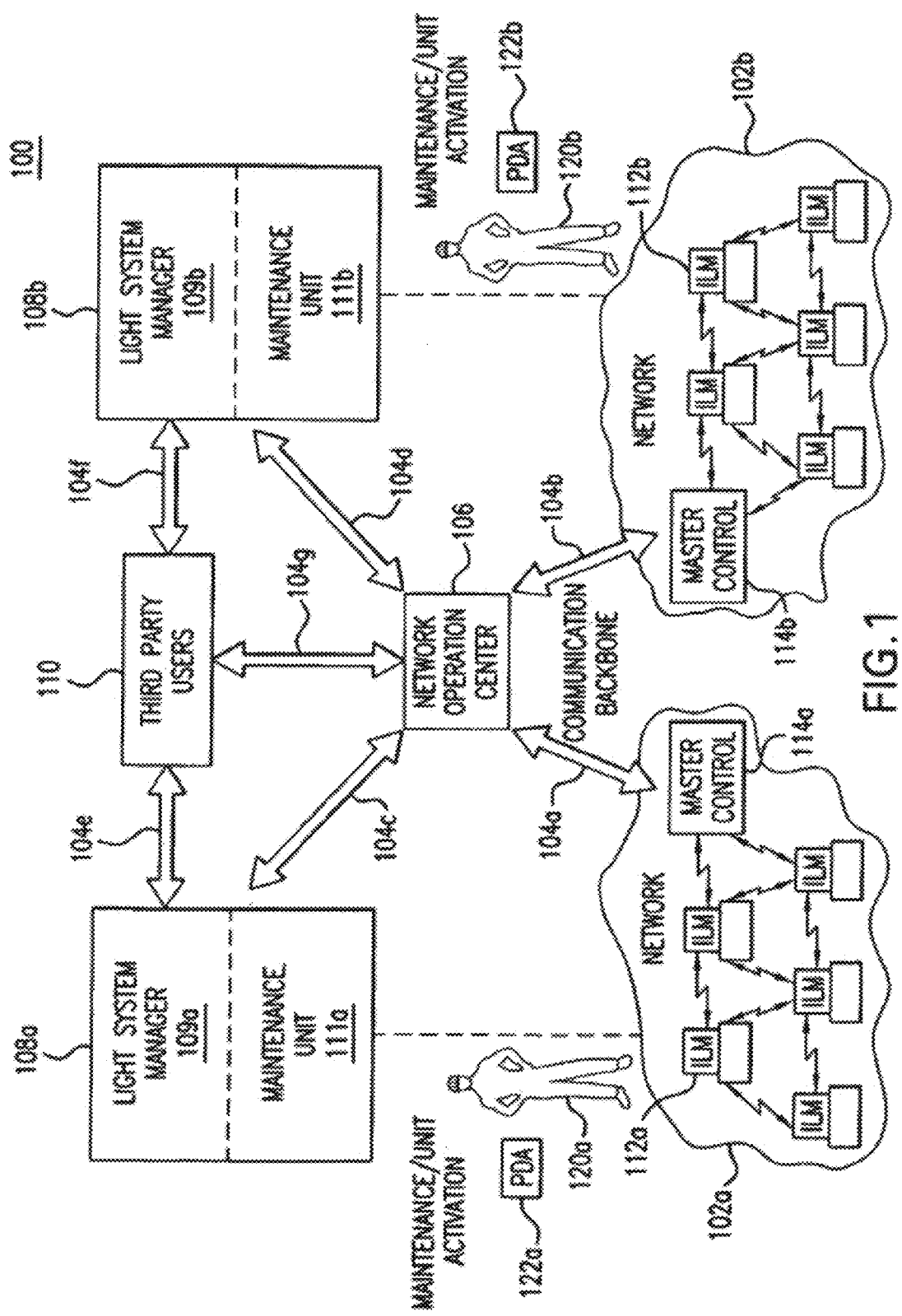
FIG. 1 illustrates a light management system in which automatic dimming control systems and methods according to the disclosure may be implemented.

FIG. 1 from U.S. Pat. No. 8,594,976 is shown below, and generally illustrates an environment in which a light management system 100, having networked intelligent luminaire managers 112, may be modified and/or incorporate aspects of the present disclosure.

As shown in FIG. 1, a light management system 100 includes networks 102a and 102b, a network operation center 106, light system owner/operators 108a and 108b, and third-party users 110. These subsystems of system 100 are linked together using appropriate communication means such as, for example, radio frequency communications, optical communications and/or power line carrier to form communications backbone 104.

Each of the networks 102a and 102b includes several intelligent luminaire managers (ILMs) 112 and a master control 114. The intelligent luminaire managers 112 communicate with each other and with master controller 114 using, for example, short-range radio frequency (RF) communication links. In some examples, these RF communication links may operate in the 900 MHz unlicensed band and have a range of about 1000 feet, but it will be appreciated that other frequencies and ranges may be utilized as well. Each of the intelligent luminaire managers 112 may control operation and/or diagnostics of a light fixture, street light, etc., which may also be referred to as a luminaire. It should be appreciated that, as discussed further below, incorporation of techniques described herein may significantly reduce both the amount of work manually performed during activation of ILMs by technicians, such as 120a and 120b, and reduce or eliminate the use of PDA hosted field units, such as 122a and 122b.

According to aspects of the disclosure, intelligent luminaire managers may include one or more processors, memory, and an interface subsystem. The memory may store a variety of programs that are executed and/or implemented using the processor. These programs may include, for example, a luminaire control program, luminaire and intelligent luminaire manager configuration program, status reporting program, and other optional programs, such as an automated dimming control program discussed further herein.

Examples may include configuring intelligent lighting fixture control modules to include an activation and learning mode, which may be leveraged by a closed-loop dimming control process discussed further below. When a module is installed to a fixture, an automated activation process may be initiated including capturing a single network identifier (such as a MAC ID) for the control module. The network identifier may be communicated to a NOC (e.g. in an activation request message) as part of registering the node with the NOC. In some examples, the NOC may determine, e.g. by previously populated data tables, whether the fixture and/or control module support dimming, and may enable or disable a dimming option in a UI at the NOC based on the results of the determination.

In some examples, control of the node may default to, or be instructed to initiate or proceed with, a learning mode for some period, e.g. after initial power-up and during a first lamp on period. In the learning mode, the control module may determine the maximum fixture wattage available, e.g. with a 10V analog control signal applied. After performing such steps, a dimming output control may be reset to normal, adhering to previous commands, soft limits or schedule(s).

Examples may include a dimming control UI (e.g. implemented on a NOC control station), and a closed-loop dimming control onboard the control module (node).

In current systems, a control portal UI may be configured to provide a 0-100% adjustment range for a dimmable asset. In some systems, this may correspond to the % of the range of adjustment allowed by the driver, not the % of rated fixture output (effectively maximum light output). This can lead to user/customer confusion regarding actual Wattage settings, requiring generation and reference to conversion tables to map between UI % and fixture Wattage %. However, according to aspects of the present disclosure, a UI % can be configured to map directly to the % of rated max fixture Wattage, providing the user/customer with more accurate and useful detail, and making dimming control decisions for the user/customer easier.

According to aspects of the disclosure, a dimming control UI may be provided including, for example, a 0-100% adjustable interface. When the user selects or adjusts a desired level, a percentage value (e.g. within 1% of the desired level), or adjustment, may be sent to the appropriate node, e.g. when the user, or a schedule, executes/demands a dimming command.

The node control module may receive and authenticate the dimming command, and may verify that the fixture is in lamp on state and that Wattage is non-zero. The control module may calculate a new target Wattage, e.g. by multiplying a stored max fixture Wattage by the demanded %, or % adjustment, command. The control module may then slew 0-10V output up/down (e.g. in a range of 0.1V/s-4.0V/s) in increment/decrements (e.g. in a range of 0.05V-0.5V) until fixture Wattage observed by the control module is within a range of target Wattage. In some examples, the dimming algorithm may also take a relatively large step change followed by smaller incremental adjustments until the target wattage (or percentage of max rated wattage) operating point is achieved. In some examples, a PID control loop may be used to dampen system response. A proportional control algorithm (with inactive integral and derivative terms) may also be used.

It is noted that, slewing fixture dim level transitions as mentioned above, as opposed to immediate step changes, can provide numerous advantages including, for example, a more subtle to the observer, reduced fixture EMI and reduced surge/strain on the driver control electronics.

Upon arrival at target Wattage, the control module may generate a dim level change event message, containing the resultant Wattage within the message payload, and send it to the NOC.

Figure 2:
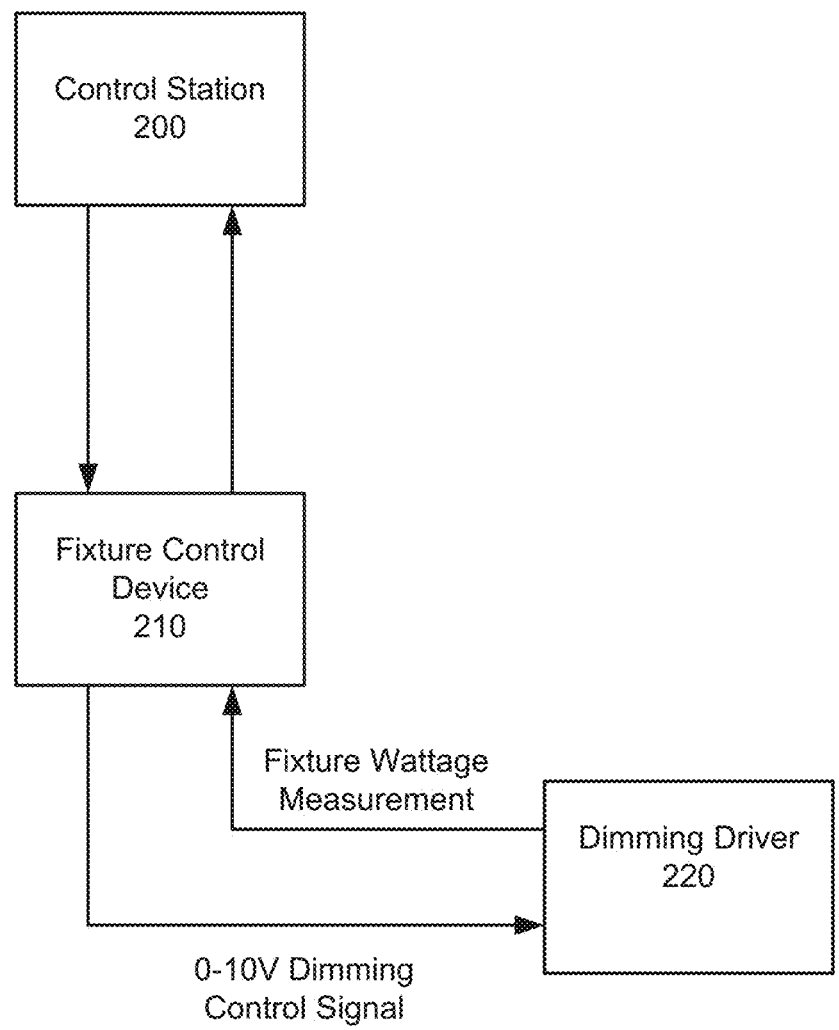
FIG. 2 is a schematic diagram depicting aspects of a closed-loop dimming control, according to an exemplary embodiment of the present disclosure.

A schematic diagram depicting aspects of a closed-loop dimming control is shown in FIG. 2.

As shown in FIG. 2, a control station 200 may communicate with a fixture control device 210 using similar means to those described above with respect to the NOC 106 and controllers 114. For example, the control station 200 may communicate with a plurality of fixture control devices 210 located remotely from the control station 200. The control station 200 may provide a dimming command to the fixture control device 210 via a user interface running on the control station 200. The control station 200 may send a dimming setting command to fixture control device 210 based on the received dimming command, e.g. a desired Wattage and/or lumen level. Fixture control device 210, that is associated with a lighting fixture (not shown), may be located remotely from the control station 200, and configured to dim the lighting fixture via a variable 0-10 V dimming control signal provide to the dimming driver 220, and adjusted based on the dimming setting command and a fixture Wattage measurement received from the dimming driver 220.

In embodiments, the fixture control device 201 may be configured to determine a target Wattage based on the dimming setting command received from the control station 200, and to iteratively adjust the dimming control signal sent to the dimming driver based on the fixture Wattage measurement provided by the dimming driver until the fixture Wattage measurement is within a predetermined range of the target Wattage, e.g. within 1%, 2.5%, 5%, 10%, etc.

In embodiments, the fixture control device 201 may be configured to slew the dimming control signal until a fixture Wattage observed by the fixture control device 210 is within the predetermined range of target Wattage.

In embodiments, the fixture control device 210 may be configured to determine a minimum dimmed Wattage supported by the lighting fixture (e.g. based on the lighting element itself and/or aspects of the dimming driver hardware) via at least one iteration of the closed-loop feedback, and to limit attempts to dim the lighting fixture below the minimum dimmed Wattage.

In embodiments, the fixture control device 210 may be configured to determine a driver dead band associated with the lighting fixture via at least one iteration of the closed-loop feedback, and to limit the dimming control signal during subsequent dimming operations to avoid the driver dead band.

In embodiments, the fixture control device 210 may use a PID control loop and/or a proportional control algorithm to vary the dimming control signal.

Figure 3:
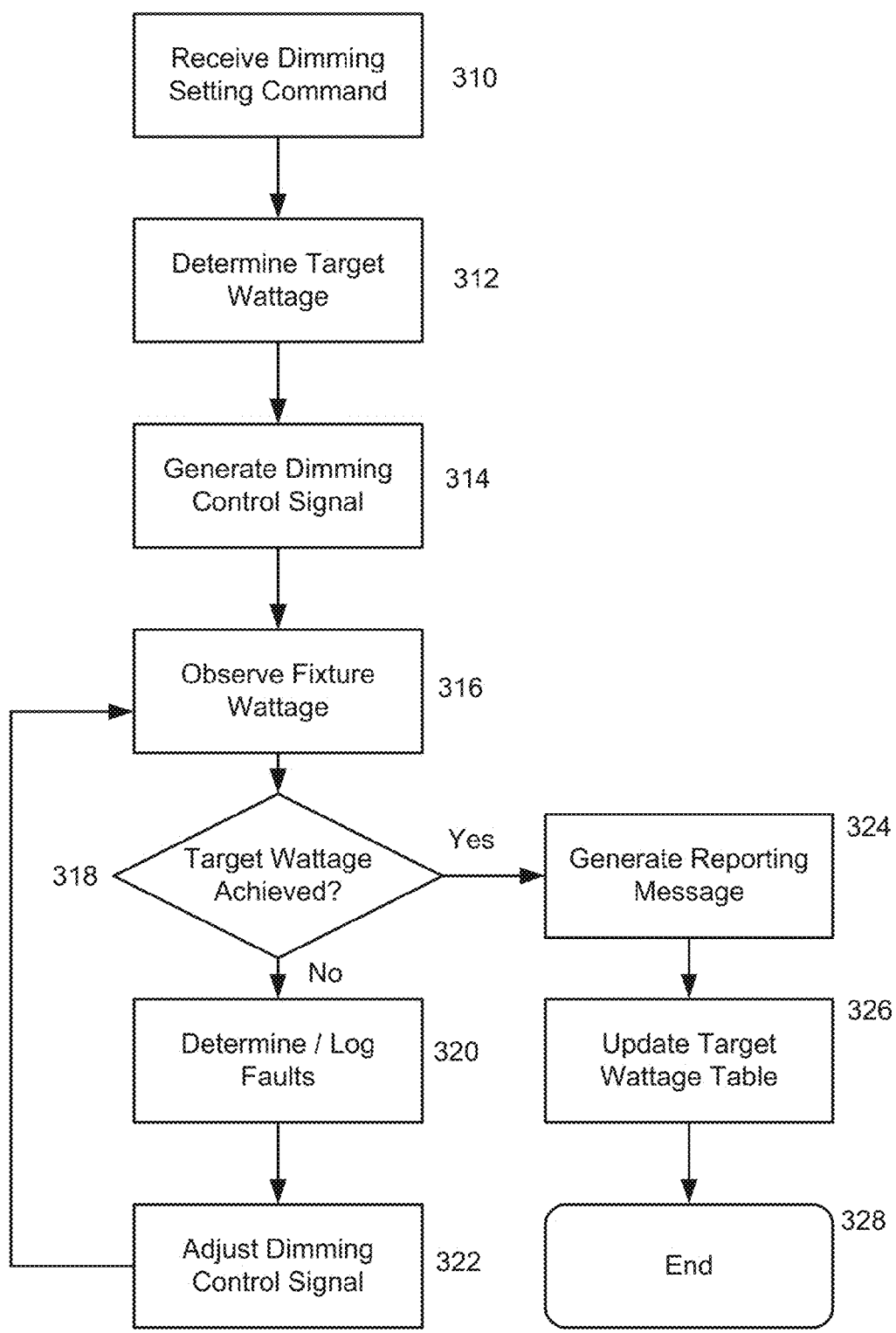
FIG. 3 is a flow chart depicting aspects of a closed-loop dimming control, according to an exemplary embodiment of the present disclosure.

FIG. 3 depicts a flow diagram of lighting control using closed-loop feedback as described herein. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order As shown in FIG. 3, process flow 300 may begin in 310, in which a dimming setting commend is received, e.g. from a network-based lighting control system. The flow may continue with 312, in which a target Wattage may be determined, for example, by the fixture control device itself.

The flow may continue with 314, in which the dimming control signal is generated, e.g. by the fixture control device. This may be derived, for example, based on one or more tables of values associated with the lighting fixture, or a rated fixture maximum Wattage and a dimming setting command expressed as a percentage.

The flow may continue with 316, in which a measured Wattage of the fixture may be observed, e.g. via direct measurement and/or via a link between a dimming driver and fixture control device as shown in FIG. 2.

The flow may continue with 318, in which a determination is made regarding whether a target Wattage has been achieved. This may represent the measured Wattage falling within a range of the target Wattage, e.g. 1%, 2.5%, 5%, 10%, etc. If the target Wattage has not been achieved, the flow may continue with 320, in which any faults may be identified and logged for later reference and/or control adjustment. For example, fixture minimum Wattage, dead zones, and the like, may be detected and logged such that future dimming control signals are limited from those zones.

The flow may continue from 320 to 322, in which the dimming control signal may be adjusted (as discussed further herein), and the adjusted dimming control signal sent back to the lighting fixture or driver such that a new measurement may be obtained in 316. The fixture control device may use at least one of a PID control loop or a proportional control algorithm to adjust the dimming control signal in 322. This closed-loop feedback may continue any number of times, or a preconfigured combination of times, until the target wattage is achieved in 318 (or the method aborts due to a failure message), and the flow continue with 324, in which a reporting message may be generated, indicating that the fixture has achieved the target Wattage (or that a failure has occurred). The message may be sent, for example, to a NOC or other remote lighting control system as described herein.

The flow may continue from 324 to 326, in which a target Wattage table or algorithm may be updated, e.g. by changing correspondence values, constants, etc., based on an analysis of the last dimming control signal and the corresponding Wattage measurement and/or target Wattage. For example, if a fixture control device initially determined that a dimming control signal should be 3V for a given dimming setting command, but the adjusted dimming control signal that actually achieved the target Wattage was 4V, then the table or algorithm that the fixture control device relied upon may be modified such that future dimming setting commands are calculated to start with a dimming control signal of 4V. If not already done so, the target Wattage table or algorithm may be updated to reflect any errors noted in 320, e.g. minimum voltage, dead zone(s), etc., or a failure category.

The flow may conclude in 328, after which the controller may operate in a standby mode until a new dimming setting, or other, command is received.

Additional options that may be incorporated in, or supplement, the flow shown in FIG. 3, or other processes implemented by a NOC or other remote lighting control system are discussed further below.

Another option for control input may allow a user to input a desired percentage light level. Thus, in some examples, a UI at the NOC may be configured to present the user with a control to specify a desired percentage light level (e.g. desired lumen output), as an alternative to, or instead of, the fixture wattage % described above. A 0-10 dimming signal output may be automatically determined by the NOC based on the input desired percentage light level, e.g. via a table that correlates fixture wattage to fixture lumen output, and sent to the node(s). In some instances, fixture groups may be configured to provide a (photometric) mapping of wattage to lumen output of the fixture to be used in this determination. Based on the received dimming signal, the control module may set a target wattage at the node, and use closed-loop dimming control to achieve target wattage.

In some examples, the node control module may be configured to override dimming commands and/or settings, e.g. in response to motion or other sensor events, and set dimming level to 100% for a default duration.

In some examples, the node may be configured to determine and/or store the minimum dimmed Wattage supported by the fixture. This could be determined, for example, by observing fixture Wattage when the dim command signal is at 0V (either by command or programmatically triggered). This value could be stored in a R/W general purpose register and optionally be used by the control module to limit future attempts to dim to extreme low levels.

In some examples, the control module may be configured to communicate the minimum supported dim level to the NOC, e.g. in order to alert the user that a commanded dim level is not possible due to the fixture hardware, and that said commanded dim level will be overridden to the minimum capability of the fixture (which could optionally be displayed on the UI).

If a particular fixture will support dimming to zero Watts (or below the specified measurement range of the photo control), this may also be communicated to the NOC, which may allow the information to be used, for example, by alert or other diagnostic algorithms, thereby avoiding a potential misdiagnosis.

According to aspects of the disclosure, bi-level dimming may also be handled correctly, e.g. if min/max fixture Wattage capabilities are implemented as described above.

In some examples, the control module may be configured to effectively ignore driver dead bands, thereby eliminating the need for certain fixture characterization, profiles and dimming diagnostic parameters to be communicated to, stored, updated and considered by the NOC.

According to aspects of the disclosure, true ratiometric dimming user interfaces may be provided to a user/customer that are accurate and easy to understand (i.e. 50% of rated Wattage=50% on UI). Systems and methods such as those described above may also automatically compensate for control modules being moved between assets, with minimal manual adaptation.

Examples may also include diagnostic programs (implemented at the control module or NOC) that determine if the fixture is not at the Wattage that was activated (including enhanced resolution for LED fixtures), whether min/max fixture Wattage shifts unexpectedly, whether the fixture is dimmable to zero or below a control module and/or system measurement specification level, when a node detects and can indicate the presence, or lack, of a dimmable driver (or non-functioning dimmable driver), etc.

In some examples, the control module may be configured to respond to remote commands, e.g. via the lighting control network, that re-initiate the activation process within the control module.

The foregoing techniques may be used in networked lighting systems, and exchange information with a network operation center. Using the services of the network operation center and a computer connected to a network operation system (e.g., via a secure Internet link), an owner/operator, such as a municipal or other utility manager, is able to register, monitor and control their assigned lights.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a support member" is a reference to one or more support members and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A lighting fixture control system, comprising:
   a control station configured to communicate with a plurality of fixture control devices located remotely from the control station, to receive a dimming command for at least one of the fixture control devices via a user interface, and to send a dimming setting command to the at least one of the fixture control devices based at least in part on the received dimming command;
   a fixture control device that is associated with a lighting fixture, located remotely from the control station, and configured to dim the lighting fixture via a variable dimming control signal based at least in part on the dimming setting command and a Wattage measurement received from the lighting fixture.

2. The system of claim 1, wherein the fixture control device includes:
   a dimming controller module; and
   a fixture power measurement module,
   wherein the dimming controller module is configured to determine a target Wattage based at least in part on the dimming setting command and to iteratively adjust the dimming control signal based at least in part on a fixture Wattage measurement obtained by the measurement module until the fixture Wattage measurement is within a predetermined range of the target Wattage.

3. A lighting fixture control apparatus, comprising:
a command-receiving module configured to receive a dimming setting command from a remote command center;
a dimming controller module; and
a fixture power measurement module,
wherein the dimming controller module is configured to determine a target Wattage value based at least in part on the dimming setting command, and to iteratively adjust a dimming control signal based at least on part on a fixture Wattage measurement provided by the fixture power measurement module until the fixture Wattage measurement is within a predetermined range of the target Wattage value.

4. The apparatus of claim 3, wherein the dimming controller module is configured to determine the target Wattage based on at least one of a table of values associated with the lighting fixture or a rated fixture maximum Wattage and the dimming setting command expressed as a percentage.

5. The apparatus of claim 3, wherein the dimming controller module is configured to determine a minimum dimmed Wattage supported by the lighting fixture based on a plurality of the fixture Wattage measurements, and to limit attempts to dim the lighting fixture below the minimum dimmed Wattage.

6. The apparatus of claim 3, wherein the dimming controller module is configured to determine a driver dead band based on a plurality of the fixture Wattage measurements, and to limit the dimming control signal during subsequent dimming operations to avoid the driver dead band.

7. The apparatus of claim 3, wherein the dimming control signal is a 0-10V control signal.

8. The apparatus of claim 3, wherein the dimming controller module uses at least one of a PID control loop or a proportional control algorithm to vary the dimming control signal.

9. The apparatus of claim 3, wherein the dimming controller module is configured to override the dimming setting command in response to a sensor event, and to set a dimming level for the lighting fixture to a predetermined level for a default period of time based on the sensor event.

10. A lighting fixture control system, comprising:
a processor;
a communication device;
memory including computer-executable instruction that configure the processor to perform operations including:
receiving a network identifier for a remote lighting control module associated with a lighting fixture;
registering the lighting control module with the lighting fixture control system;
determining whether at least one of the lighting control module or the lighting fixture supports a dimming function;
enabling a dimming option in a user interface based on a determination that the at least one of the lighting control module or the lighting fixture supports a dimming function;
receiving a dimming input control via the user interface; and
providing a dimming setting signal to the lighting control module based at least in part on the received dimming input control.

11. The system of claim 10, further comprising computer-executable instructions for receiving a message that the at least one of target dimmed fixture wattage value or the target dimmed fixture lumen output has been implemented by the lighting control module.

12. The system of claim 10, wherein the dimming setting signal is a 0-10V dimming signal that is automatically determined by the system based on a desired percentage light level via a table that correlates fixture wattage to fixture lumen output.

13. A lighting fixture control system, comprising:
a control station configured to communicate with a plurality of fixture control devices located remotely from the control station, to receive a dimming command for at least one of the fixture control devices via a user interface, and to send a dimming setting command to the at least one of the fixture control devices based at least in part on the received dimming command;
a fixture control device that is associated with a lighting fixture, located remotely from the control station, and configured to dim the lighting fixture via a variable dimming control signal based at least in part on the dimming setting command and a Wattage measurement received from the lighting fixture;
a fixture power measurement module; and
a dimming controller module configured to determine a target Wattage based at least in part on the dimming setting command and to iteratively adjust the dimming control signal based at least in part on a fixture Wattage measurement obtained by the measurement module until the fixture Wattage measurement is within a predetermined range of the target Wattage.

14. The system of claim 13, wherein the fixture control device is configured to set a target Wattage based at least in part on the received dimming command, and to use closed-loop feedback to achieve the target Wattage.

15. The system of claim 14, wherein the fixture control device is configured to slew the dimming control signal until a fixture Wattage observed by the fixture control device is within a predetermined range of target Wattage.

16. The system of claim 14, wherein the target Wattage is determined based on at least one of a table of values associated with the lighting fixture or a rated fixture maximum Wattage and a dimming setting command expressed as a percentage.

17. The system of claim 14, wherein the fixture control device is configured to determine a minimum dimmed Wattage supported by the lighting fixture via at least one iteration of the closed-loop feedback, and to limit attempts to dim the lighting fixture below the minimum dimmed Wattage.

18. The system of claim 14, wherein the fixture control device is configured to determine a driver dead band via at least one iteration of the closed-loop feedback, and to limit the dimming control signal during subsequent dimming operations to avoid the driver dead band.

19. The system of claim 13, wherein the dimming control signal is a 0-10V control signal.

20. The system of claim 13, wherein the fixture control device uses at least one of a PID control loop or a proportional control algorithm to vary the dimming control signal.

* * * * *